(12) United States Patent
Akamatsu et al.

(10) Patent No.: US 7,729,797 B2
(45) Date of Patent: Jun. 1, 2010

(54) ARTICLE TRANSPORT APPARATUS FOR AN ARTICLE STORAGE SYSTEM, AND A METHOD OF OPERATING THE APPARATUS

(75) Inventors: Yoshinori Akamatsu, Hirakata (JP); Yuichi Ueda, Yasu (JP)

(73) Assignee: Daifuku Co., Ltd., Osaka (JP)

( * ) Notice: Subject to any disclaimer, the term of this patent is extended or adjusted under 35 U.S.C. 154(b) by 762 days.

(21) Appl. No.: 11/517,953

(22) Filed: Sep. 8, 2006

(65) Prior Publication Data

US 2007/0059132 A1   Mar. 15, 2007

(30) Foreign Application Priority Data

Sep. 9, 2005   (JP) .............................. 2005-262401

(51) Int. Cl.
*G06F 7/00* (2006.01)
(52) U.S. Cl. ..................................... 700/214; 700/228
(58) Field of Classification Search ................. 700/213, 700/214, 228; 414/814, 812, 800
See application file for complete search history.

(56) References Cited

U.S. PATENT DOCUMENTS

| | | | | |
|---|---|---|---|---|
| 7,169,675 | B2* | 1/2007 | Tan et al. ..................... | 438/301 |
| 7,269,675 | B2* | 9/2007 | Dalakuras et al. ........... | 710/107 |
| 7,283,890 | B2* | 10/2007 | Iijima et al. ................. | 700/228 |
| 7,289,875 | B2* | 10/2007 | Recktenwald et al. ....... | 700/213 |
| 2002/0177924 | A1* | 11/2002 | Manes et al. ................ | 700/218 |
| 2003/0097200 | A1* | 5/2003 | Searle et al. ................ | 700/214 |
| 2005/0036858 | A1 | 2/2005 | Ueda | |
| 2007/0288123 | A1* | 12/2007 | D'Andrea et al. ........... | 700/214 |

FOREIGN PATENT DOCUMENTS

| | | |
|---|---|---|
| JP | 05-178408 | 7/1993 |
| JP | 06-100109 | 4/1994 |
| JP | 08-192904 | 7/1996 |
| JP | 09-208009 | 8/1997 |
| JP | 2002-060010 | 2/2002 |
| JP | 2003-285903 | 10/2003 |
| JP | 2004-157885 | 6/2004 |

* cited by examiner

*Primary Examiner*—Gene Crawford
*Assistant Examiner*—Ramya Prakasam
(74) *Attorney, Agent, or Firm*—The Webb Law Firm

(57) ABSTRACT

An article transport apparatus comprises:
an article transporting mobile body movable along a predetermined path extending along a storage rack having a plurality of article storage units;
a loading unit disposed on the predetermined path for supporting an article to be stored;
an article transfer device disposed on the mobile body for transferring the article;
operation control device for controlling traveling operation of the mobile body and transfer operation of the article transfer device; and
article position detection device for detecting a position, in a first direction along a traveling direction of the mobile body, of the article transferred from the loading unit to the mobile body;
wherein the operation control device obtains a misalignment amount with respect to a predetermined proper position, in the first direction, of the article transferred from the loading unit to the mobile body, based on detected information from the article position detection device, and corrects a horizontal component of an article transfer position for an article storage unit to which the article is to be transferred, based on the misalignment amount.

18 Claims, 7 Drawing Sheets

ARTICLE TRANSPORT APPARATUS FOR AN ARTICLE STORAGE SYSTEM, AND A METHOD OF OPERATING THE APPARATUS

BACKGROUND OF THE INVENTION

Conventionally, an article transport apparatus for an article storage system includes a stacker crane (mobile body) having a fork device (article transfer device) for transporting articles between an article receiving table (loading station) and a plurality of article storage units in storage racks. When causing the stacker crane to run toward the article receiving table, operation control means carries out a loading travel control for running the stacker crane to an article transfer position opposed to the article receiving table as a target stopping position, based on information from position detecting means that detects positions on a traveling path of the stacker crane. When running the stacker crane toward an article storage unit to which an article is to be transferred, among the plurality of article storage units, the operation control means carries out a storage running control for running the stacker crane to an article transfer position opposed to that article storage unit as a target stopping position, based on information from the position detecting means. (See Japanese Patent Publication (Unexamined) No. 2004-157885, for example.)

The position of an article placed on the article receiving table is variable in a traveling direction of the stacker crane due to a misalignment occurring when the article is supplied from outside by a forklift or the like. Consequently, when the article is transferred under a loading transfer control from the article receiving table to the stacker crane located in the article transfer position opposed to the article receiving table, the position relative to the stacker crane of the article transferred will also vary in the traveling direction of the stacker crane.

The position opposed to the article receiving table where the stacker crane stops under the loading travel control may vary in the traveling direction of the stacker crane from the predetermined article transfer position opposed to the article receiving table. In this case also, when an article is transferred under the loading transfer control from the article receiving table to the stacker crane, the position relative to the stacker crane of the article transferred will also vary in the traveling direction of the stacker crane.

When the position relative to the stacker crane of the article transferred to the stacker crane varies in the traveling direction of the stacker crane as noted above, even though the stacker crane is stopped accurately in an article transfer position for an article storage unit which is the destination of the article, the position of the article held by the stacker crane will vary in the traveling direction of the stacker crane from a proper position relative to the article storage unit, that is, a position where the middle of the article in the traveling direction of the stacker crane coincides with the middle of the article storage unit in the traveling direction of the stacker crane. In order to store the article deviating in the traveling direction of the stacker crane from a proper position relative to an article storage unit, in the article storage unit under the storing transfer control, while avoiding contact between the article and storage rack, for example, the plurality of article storage units need to have a sufficient length along the traveling direction of the stacker crane to allow for variations in the position of the article, and variations in the article transfer position, where the stacker crane stops, relative to an article storage unit which is the destination of the article. As a result, the storage rack has an increased length in the traveling direction of the stacker crane, which leads to an increase in the manufacturing cost of the storage rack and an enlarged installation space of the article storage system. Further disadvantages are that an increase in the traveling distance of the stacker crane lowers transporting efficiency and increases running cost.

SUMMARY OF THE INVENTION

This invention has been made having regard to the drawback of the prior art noted above, and its object is to provide an article transport apparatus for an article storage system capable of setting a position of a transported article, in time of transfer, closer to a proper position relative to a destination such as an article storage unit.

The above object is fulfilled, according to this invention, by an article transport apparatus comprising an article transporting mobile body movable along a predetermined path extending along a storage rack having a plurality of article storage units; a loading unit disposed on said predetermined path for supporting an article to be stored; an article transfer device disposed on said mobile body for transferring the article; operation control means for controlling traveling operation of said mobile body and transfer operation of said article transfer device; and article position detection means for detecting a position, in a first direction along a traveling direction of said mobile body, of the article transferred from said loading unit to said mobile body. The operation control means obtains a misalignment amount with respect to a predetermined proper position, in said first direction, of the article transferred from said loading unit to said mobile body, based on detected information from said article position detection means, and corrects a horizontal component of an article transfer position for an article storage unit to which the article is to be transferred, based on the misalignment amount.

Thus, the article transport apparatus for an article storage system according to the invention is capable of setting a position of a transported article, in time of transfer, closer to a proper position relative to a destination such as an article storage unit.

DETAILED DESCRIPTION OF PREFERRED EMBODIMENTS

Figure 1:
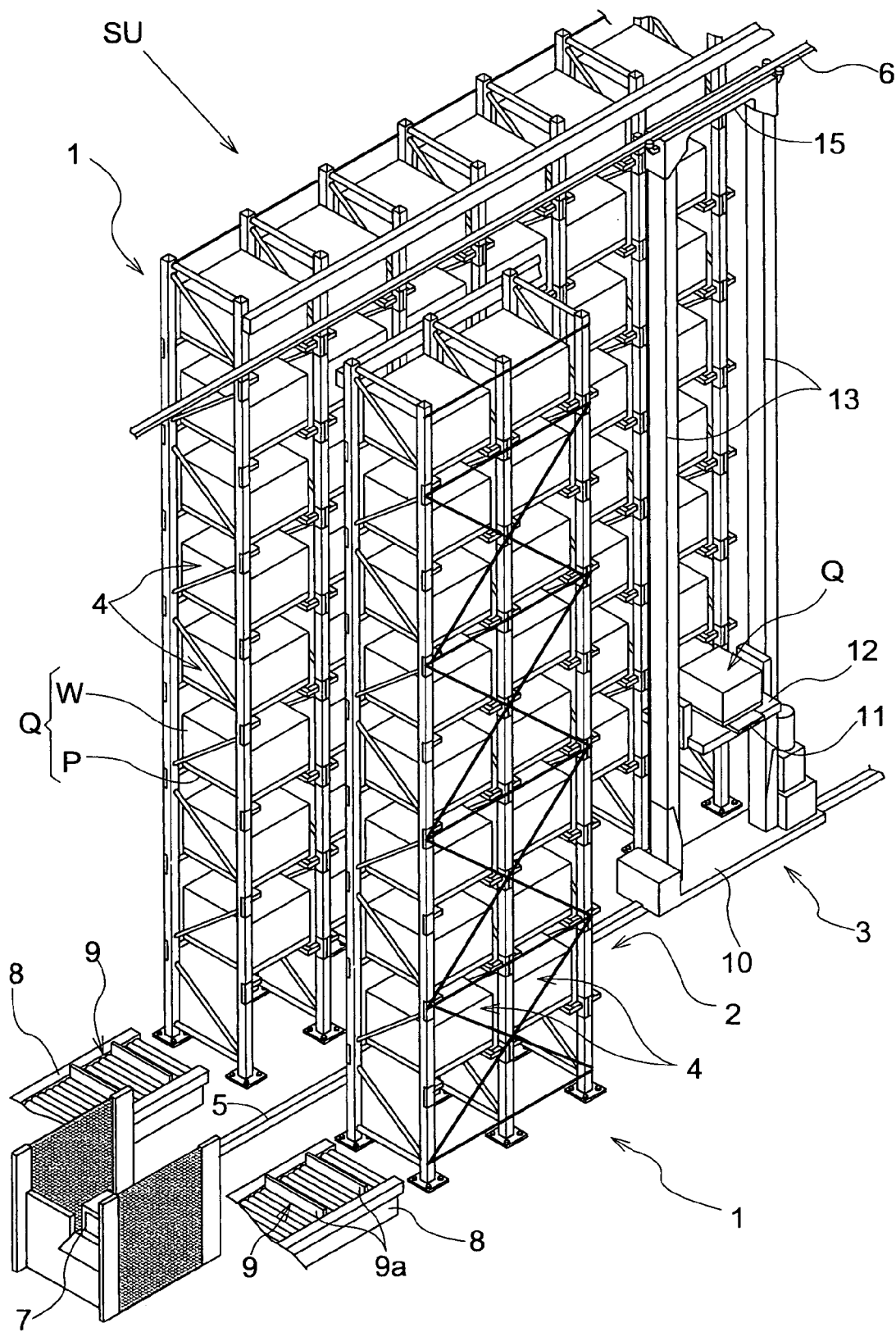
FIG. 1 is a perspective view of an article storage system.

An article transport apparatus according to this invention will be described hereinafter with reference to the drawings. The article transport apparatus is installed in an article storage system SU. As shown in FIG. 1, the article storage system SU includes two storage racks 1 installed with a space in between, and with opposite article inputting and outputting directions, and a stacker crane 3 (mobile body) automatically movable along a traveling path 2 formed between the two storage racks 1. Each storage rack 1 has a plurality of article storage units 4 arranged vertically and horizontally.

The traveling path 2 has a rail track 5 and an upper rail 6 extending longitudinally of the storage racks 1. Adjacent one end of the traveling path 2 are a ground controller 7 (operation control means) for controlling operation of the stacker crane 3, and a pair of loading and unloading conveyers 8 (loading units) opposed to each other across the rail track 5. The stacker crane 3 stops at a position of origin P0 serving as an article transfer position set to the traveling path 2 as corresponding to the ends opposed to the storage racks 1 of the loading and unloading conveyors 8, to transfer articles to and from the loading and unloading conveyors 8. In this invention, the ground controller 7 has a CPU for performing functions described hereinafter, a memory and a communication function. The memory stores software for executing functions and algorithms described in detail hereinafter.

The loading and unloading conveyors 8 are roller conveyor-type transport devices, and each includes a hoisting device 9 disposed in a position corresponding to the position of origin P0 on a transport path of the loading and unloading conveyor 8, to be vertically movable as supporting, from below, a load W including an article Q placed on a palette P. The hoisting device 9 has a set of vertically movable article support plates 9a spaced apart in a transport direction of the loading and unloading conveyor 8. The support plates 9a in their vertical movement project or retract through gaps between rollers of the loading and unloading conveyor 8, to raise or lower an article Q. Operation of the hoisting device 9 of each loading and, unloading conveyer 8 is controlled by the ground controller 7 as are the operation of the stacker crane 3 and transport operation of the loading and unloading conveyers 8.

Figure 2:
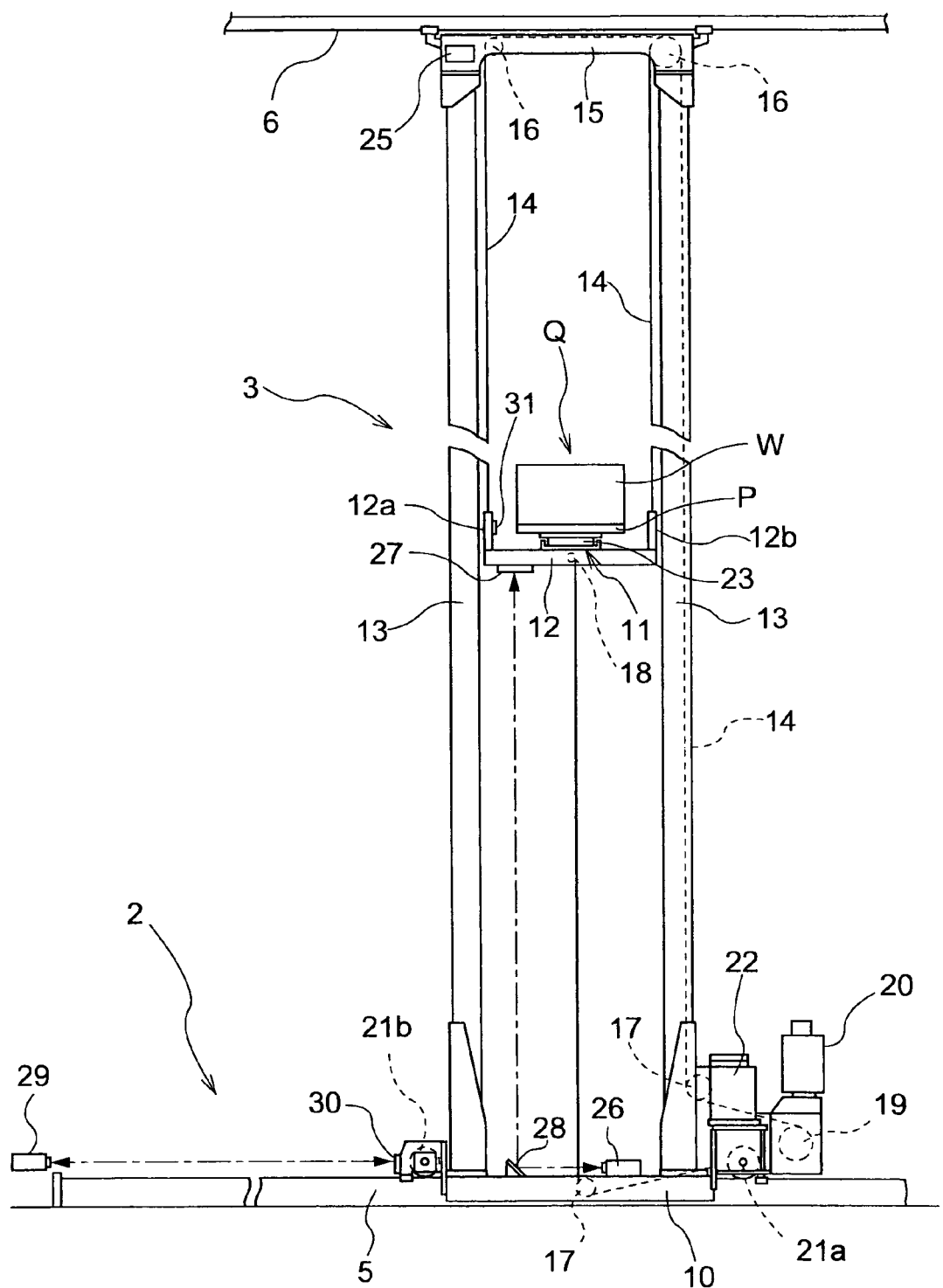
FIG. 2 is a front view of a stacker crane.

As shown in FIG. 2, the stacker crane 3 includes a carriage 10 for running along the rail track 5, and a lift deck 12 vertically movable relative to the carriage 10. An article transfer device 11 is mounted on the lift deck 12 for transferring the loads W including the palettes P between the loading and unloading conveyors 8 or article storage units 4, and the lift deck 12.

The article transfer device 11 has a well-known construction including a fork 23 for receiving and supporting a palette P with a load W placed thereon, and movable between a retracted position on the lift deck 12 and a projecting position outward of the lift deck 12, and a fork motor 24 (FIG. 4) acting as drive means for extending and retracting the fork 23. The article transfer device 11 is adapted to extend and retract the fork 23 in article transfer directions which are perpendicular to the traveling direction of the carriage 10. Various other well-known devices may be used as the article transfer device. One such example is disclosed in US Patent Application Publication 2005/0036858A1. This application document is incorporated herein by reference.

Through running of the carriage 10, vertical movement of the lift deck 12, and extension and retraction of the fork 23 of the article transfer device 11, the stacker crane 3 transports palettes P with loads W placed thereon, between the loading and unloading conveyors 8 and article storage units 4 and between the article storage units 4.

The carriage 10 has a pair of lift masts 13 spaced apart in the fore and aft direction for vertically movably guiding and supporting the lift deck 12. Thus, the lift deck 12 is vertically movable relative to the carriage 10. The front and rear lift masts 13 are interconnected at upper ends thereof by an upper frame 15 guided to move along the upper rail 6.

The carriage 10 further includes a vertical laser range finder 26 for emitting a beam of light horizontally, and a mirror 28 for deflecting vertically upward the beam of light emitted from the laser range finder 26 and irradiating a reflector plate 27 attached to a lower surface of the lift deck 12.

The vertical laser range finder 26 detects a distance of the lift deck 12 from a reference position which is the position of the mirror 28 on the carriage 10, thereby to detect a vertical position of the lift deck 12 on its vertical moving path. That is, the vertical laser range finder 26 acts as vertical position detecting means.

An angle sensor 25 is disposed adjacent an upper end of one of the lift masts 13 to act as sway detecting means for detecting an amplitude of swaying in the traveling direction of the lift mast 13 occurring with a traveling operation of the stacker crane 3. The angle sensor 25 is a well-known sensor having a member suspended straight down like a pendulum, and sensing an angle of this member to detect an angle of the lift mast 13 to the vertical direction. The angle sensor 25 outputs a sway detection signal S1 which is an analog output signal with an output level changing up and down across a reference level according to shifts from neutral. The angle sensor 25 is adjusted to be neutral when no sway occurs with the lift mast 13.

Specifically, when the lift mast 13 is upright with zero amplitude of sway, the angle sensor 25 maintains the neutral state, and the sway detection signal S1 has a fixed value V. When the lift mast 13 is inclined from the upright state or when the lift mast 13 is deformed or flexed, the sway detection signal S1 outputted has a value higher or lower than the fixed value V according to an amplitude of sway Y of the lift mast 13 resulting from the inclination, deformation or flexion. Thus, an amplitude of sway Y in the traveling direction of the lift mast 13 may be detected by measuring an amplitude of sway detection signal S1.

The lift deck 12 is suspended and supported by two lifting chains 14 connected to side walls 12a and 12b constructed at opposite ends in the longitudinal direction thereof. The lifting chains 14 are wound around upper side idler pulleys 16, carriage side idler pulleys 17, a lift deck side idler pulley 18 and a drive pulley 19.

The upper idler pulleys 16 are arranged at a front end and a rear end of the upper frame 15. The carriage side idler pulleys 17 are arranged at one end and a central part of the carriage 10. The lift deck side idler pulley 18 is attached to a central part on the lower surface of the lift deck 12. The drive pulley 19 is disposed in one end region of the carriage 10.

A lifting motor 20 is provided for rotating the drive pulley 19. With the lifting motor 20 rotating the drive pulley 19 forward and backward, the lifting chains 14 are driven in the longitudinal direction thereof to move the lift deck 12 up and down.

Figure 7:
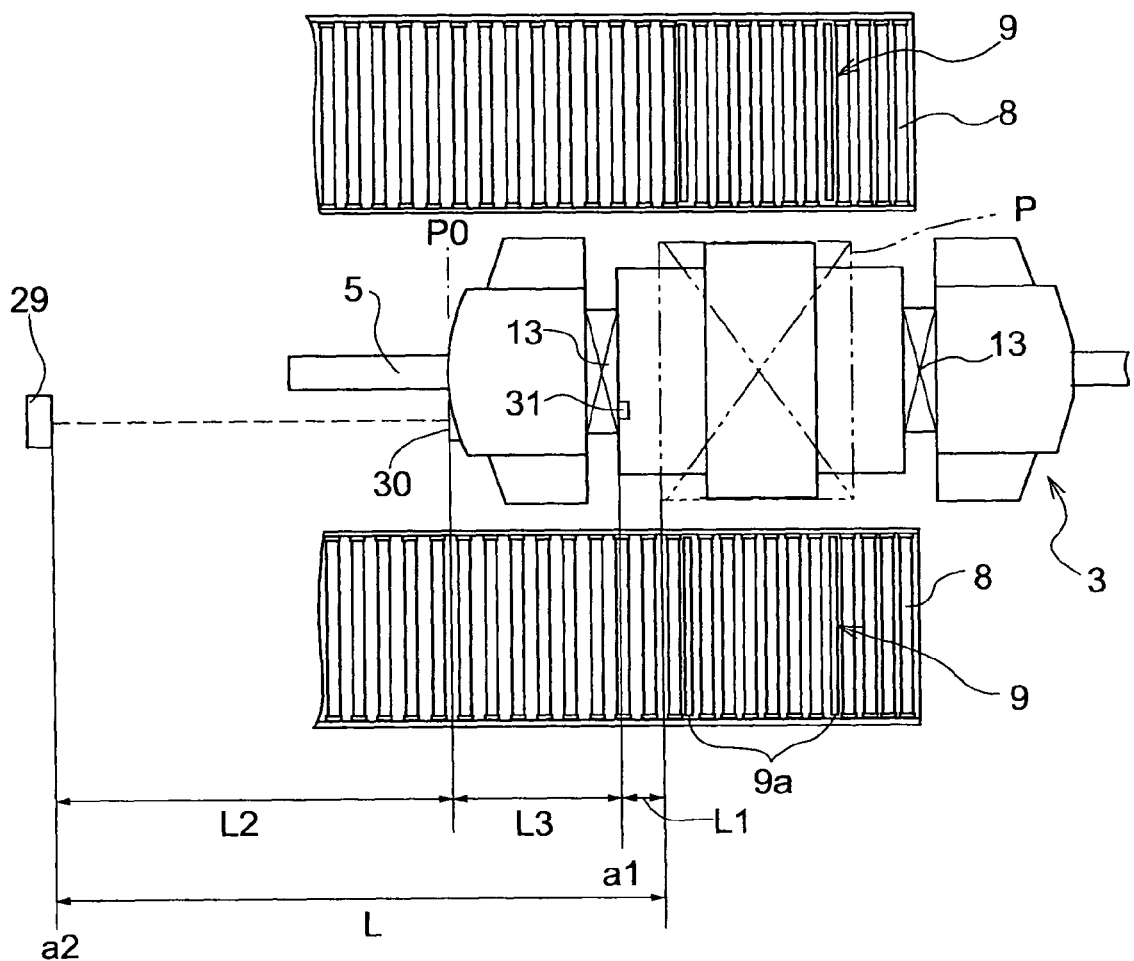
FIG. 7 is a plan view of the stacker crane having stopped in the position of origin.

As shown in FIG. 7, a distance sensor 31 is attached to the side wall 12a for detecting a distance L1 to a palette P placed and supported on the article transfer device 11. The distance sensor 31 detects the distance by using an infrared emitting diode and a light receiver which is a PIN type photodiode acting as a position sensing element. The distance detection employs an optical range finding method.

Specifically, the distance sensor 31 emits infrared radiation to a side wall of the palette P opposed to the side wall 12a of the lift deck 12, and calculates the distance L1 (FIG. 7) from the distance sensor 31 to the side of the palette P by the principle of triangulation based on a position in the sensor 31 of incidence of reflected light. The position of the palette P on the stacker crane 3 is detectable from a value of distance L1 from the distance sensor 31 to the side wall of the palette P.

That is, the distance sensor 31 functions as article loading position detecting means for detecting a position in the traveling direction relative to the stacker crane 3 of a load W placed on the palette P transferred from one of the loading and unloading conveyers 8 to the stacker crane 3. As this distance sensor 31, and other range finders described hereinafter, it is possible to employ well-known sensors using lights of other frequencies or laser, or sensors using sound wave, for example. The well-known sensors include a sensor that outputs light or sound, receives the light or sound reflected by the side wall of the palette P, and detects a distance by measuring a time elapsed between the output and reception. A reflector plate may be attached to the side wall of the palette P.

The carriage 10 has a pair of front and rear running wheels 21a and 21b for running on the rail track 5. The running wheel 21a adjacent one end in the fore and aft direction of the carriage 10 acts as a drive wheel driven by a propelling motor 22. The wheel 21b adjacent the other end in the fore and aft direction of the carriage 10 is a freely rotatable idler wheel. Thus, the carriage 10 is adapted to travel along the rail track 5 by operation of the propelling motor 22.

A horizontal laser range finder 29 is disposed at the end of the rail track 5 adjacent the ground controller 7 for emitting a range finding beam of light horizontally. The carriage 10 has a reflector plate 30 for reflecting the beam of light from the horizontal laser range finder 29. The horizontal laser range finder 29 emits a beam toward the reflector plate 30 mounted on the carriage 10, and detects a distance L2 (FIG. 7) of the carriage 10 from the end of the rail track 5, thereby to detect a horizontal position of the carriage 10 on the traveling path 2.

That is, the horizontal laser range finder 29 functions as a mobile body position detecting means for detecting a position of the stacker crane 3 on the traveling path 2. As this horizontal laser range finder 29, it is possible to use a different sensor described in this specification. The position detecting means may include a rotation sensor having a gear attached to the carriage 10, and a toothed rail engaged with the gear and laid on the ground. The position detecting means may include a sensor having a device for outputting light or sound toward the ground. Thus, various well-known techniques are available as the position detecting means for detecting positions of the carriage 10.

Figure 4:
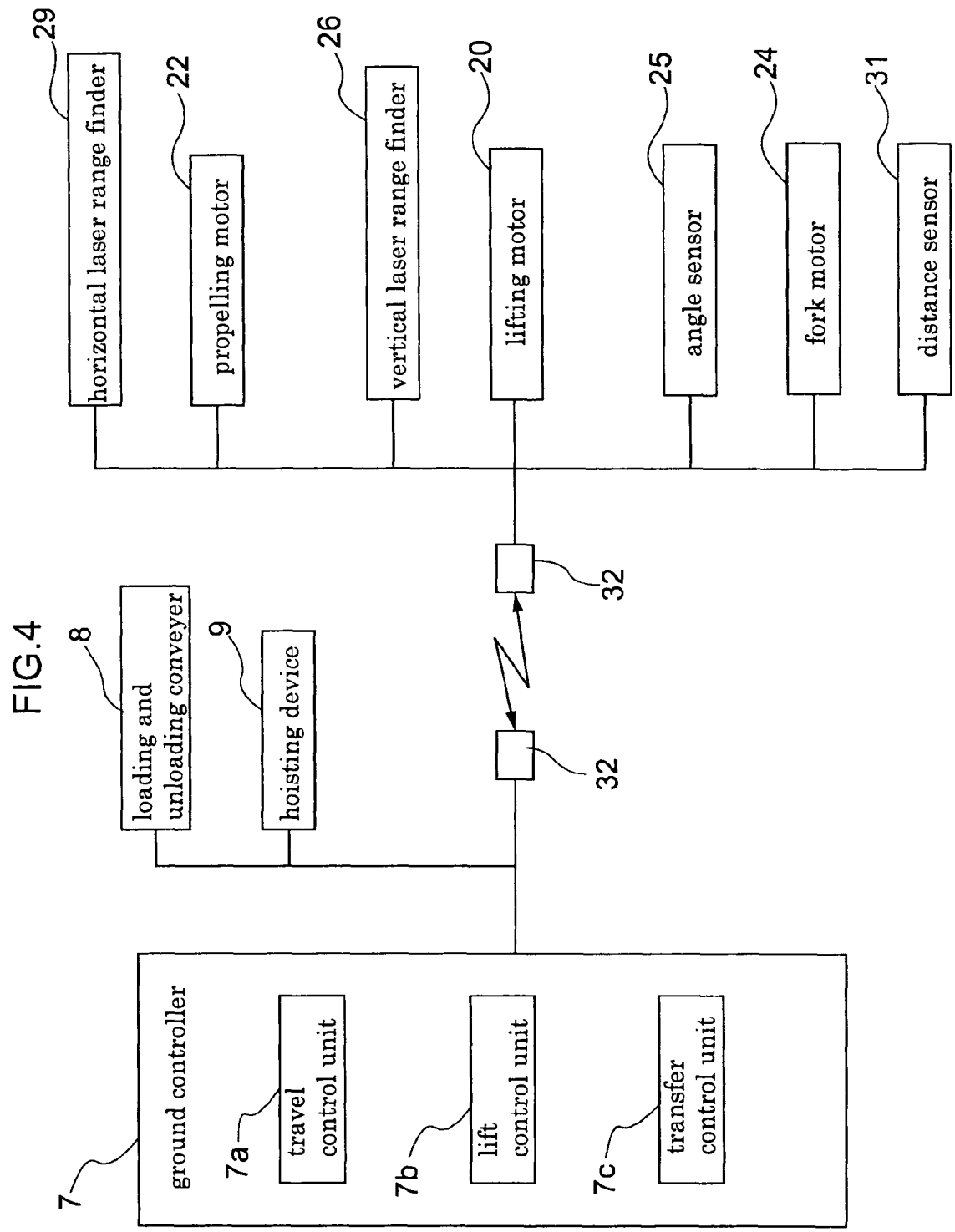
FIG. 4 is a control block diagram of an article transport apparatus.

As shown in FIG. 4, the horizontal laser range finder 29, vertical laser range finder 26, angle sensor 25 and distance sensor 31 are arranged to input detected information to the ground controller 7 through an infrared communication device 32. The ground controller 7 may be regarded as including a travel control unit 7a for controlling running of the carriage 10, a lift control unit 7b for controlling vertical movement of the lift deck 12, and a transfer control unit 7c for controlling operation of the article transfer device 11. It is desirable that these control units are parts of software, but they may be physically different parts.

The ground controller 7 receives from a supervising device or the like a deposition command for receiving an article Q carried in from outside by one of the loading and unloading conveyers 8 and storing the article Q in one of the article storage units 4, or a delivery command for delivering an article Q from one of the article storage units 4 to one of the loading and unloading conveyers 8. Then, the ground controller 7 controls operation of the stacker crane 3, propelling motor 22, lifting motor 20 and fork motor 24, and controls operation of the loading and unloading conveyers 8, in order to carry out a storing operation for receiving the article Q from the loading and unloading conveyer 8 and storing the article Q in a designated article storage unit 4, or a delivering operation for delivering the article Q from a designated article storage unit 4 to the loading and unloading conveyer 8.

Figure 3:
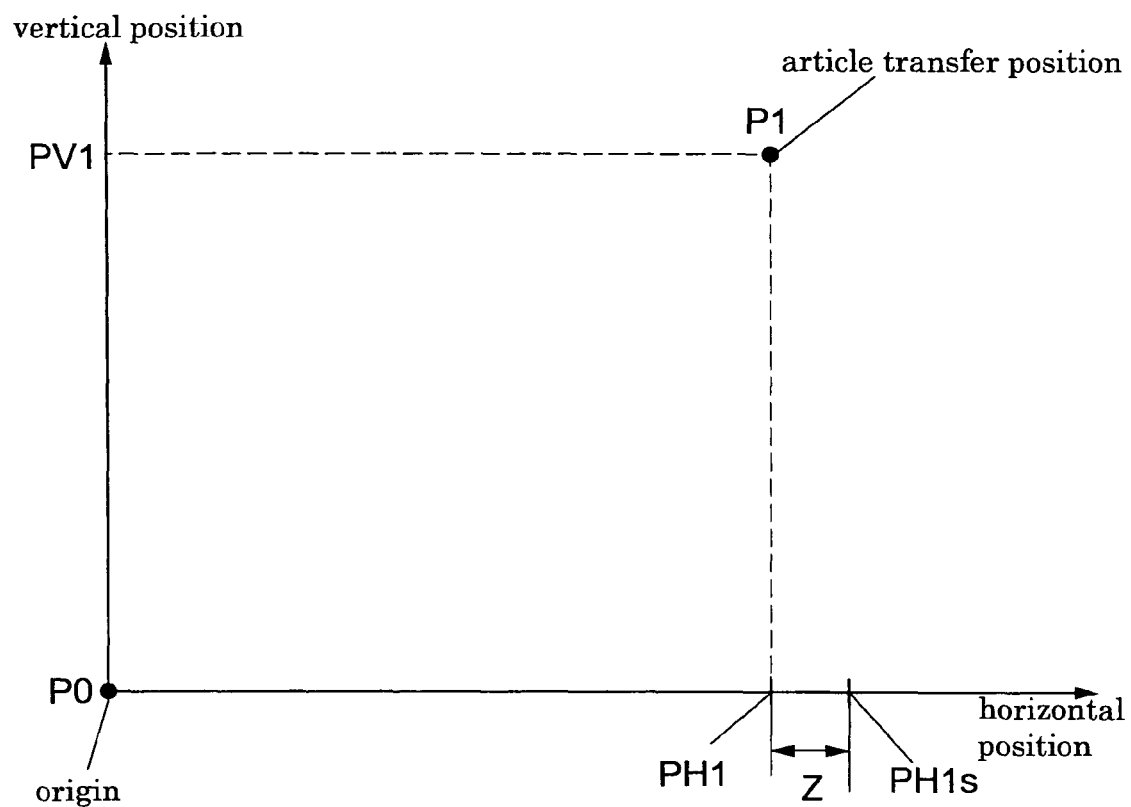
FIG. 3 is a view showing a relationship between a position of origin and an article transfer position for an article storage unit.

The control of the storing operation by the ground controller 7 will be described with reference to the flow chart shown in FIG. 5. The following description will be made on the assumption that, as shown in FIG. 3, an operation is carried out for storing an article Q in an article storage unit 4 corresponding to an article transfer position P1 (FIG. 3) where the stacker crane 3 is in a horizontal position PH1 and the article transfer device 11 is in a vertical position PV1. The article transfer horizontal position PH1 and article transfer vertical position PV1 are a predetermined horizontal position of the carriage 10 and a predetermined vertical position of the article transfer device 11 corresponding to each of the article storage units 4.

The ground controller 7 first performs loading travel control and loading lift control to run the stacker crane 3 to the position of origin P0 which is the article transfer position opposed to the loading and unloading conveyers 8, and to move the article transfer device 11 vertically, based on the detected information from the horizontal laser range finder 29 and vertical laser range finder 26 (step #1-step #2). Then, the ground controller 7 performs loading transfer control in which, with the stacker crane 3 and article transfer device 11 located in the position of origin P0, the hoisting device 9 of one of the loading and unloading conveyers 8 and the article transfer device 11 of the stacker crane 3 are operated to transfer an article Q from the loading and unloading conveyer 8 to the stacker crane 3 (step #3).

When the loading transfer control is completed, the article Q lies on the stacker crane 3. In this state, the ground controller 7 performs an article transfer horizontal position correcting process (step #4). As described in detail hereinafter, the article transfer horizontal position correcting process is carried out to correct the article transfer horizontal position PH1 set beforehand with respect to the article storage unit 4 which is the destination of the article Q, according to an amount of misalignment Z from a proper position in the traveling direction relative to a ground reference position of the article Q transferred to the stacker crane 3.

As a result, even if the storing operation results in shifting of the position of the stacker crane 3 after the loading travel control carried out to set the stacker crane 3 to the position of origin P0, i.e. the position of the stacker crane 3 when the loading transfer control is performed, and shifting of the position relative to the stacker crane 3 of the article Q transferred to the stacker crane 3 by the loading transfer control, the position relative to the stacker crane 3 of the article Q is substantially fixed in time of execution of a storing transfer control described hereinafter.

When a correction of the article transfer horizontal position PH1 is completed in step #4, the storing travel control and storing lift control are performed. In the storing travel control, the stacker crane 3 is moved to a position PH1s which is a corrected article transfer horizontal position PH1 based on the detected information from the horizontal laser range finder 29. In the storing lift control, the article transfer device 11 is vertically moved to the article transfer vertical position PV1 corresponding to the article storage unit 4, which is the destination of the article Q, among the plurality of article storage units 4 based on the detected information from the vertical laser range finder 26 (step #5-step #7).

After the traveling operation of the stacker crane 3 to the corrected article transfer horizontal position PH1s and the lifting operation of the article transfer device 11 to the article transfer vertical position PV1, the ground controller 7 performs a sway amplitude monitoring process (step #8). The sway amplitude monitoring process monitors a sway amplitude Y in the traveling direction of the lift mast 13 calculated from an amplitude of the sway detection signal S1 outputted from the angle sensor 25. When the sway amplitude Y in the traveling direction of the lift mast 13 is equal to or less than a predetermined permissible sway amplitude C, the storing transfer control is carried out noting that the article can be transferred to the intended article storage unit 4 without a problem of interference with adjoining article storage units 4.

When, in step #8, the sway amplitude Y in the traveling direction of the lift mast 13 is determined not to exceed the predetermined permissible sway amplitude C, the ground controller 7 performs the storing transfer control in step #9. In the storing transfer control, the article transfer device 11 is operated to transfer the article Q from the stacker crane 3 to the intended article storage unit 4, while the stacker crane 3 is located in the corrected article transfer horizontal position PH1s relative to the intended article storage unit 4, and the article transfer device 11 is located in the article transfer vertical position PV1 relative to the intended article storage unit 4. With completion of the storing transfer control, the storing process for storing the article Q in the article storage unit 4 is completed.

As described above, after step #1 and step #2 of the storing process are executed, the stacker crane 3 is set to the position of origin P0 by the loading travel control. However, the position where the stacker crane 3 actually stops under the loading travel control is, strictly speaking, varied each time the storing process is carried out due to the influence of travel control performance. The position where the stacker crane 3 actually stops may deviate forward or backward in the traveling direction, which is caused by a certain abnormality other than the limitation of the travel control performance. When the loading transfer control is performed in such a state, the article Q transferred to the stacker crane 3 cannot be placed in an originally intended proper transfer position. The article Q is transferred to a position deviating from the proper transfer position on the stacker crane 3.

Further, even if the stacker crane 3 is accurately located in the position of origin P0 by the loading travel control, the loading transfer control will result in a failure in transferring the article Q to the predetermined proper transfer position on the stacker crane 3 unless the article Q is in a proper position on the loading and unloading conveyer 8. The article Q will be transferred to a position deviating from the predetermined proper transfer position.

When, as noted above, the article Q is not transferred to the predetermined proper transfer position on the stacker crane 3, even if the stacker crane 3 is properly set to the article transfer horizontal position PH1 by the storing travel control, the article Q transferred to the article storage unit 4 by the storing transfer control will not be transferred to a proper position in the direction of width (i.e. horizontal direction) of the article storage unit 4.

A deviation from the proper position relative to the loading and unloading conveyer 8 of the article Q on the loading and unloading conveyer 8 may be offset by a deviation from the position of origin P0 of the stacker crane 3. As a result, the article Q can be transferred to the predetermined proper transfer position on the stacker crane 3. However, in this case also, since the stacker crane 3 deviates from the position of origin P0, when the stacker crane 3 is moved by the storing travel control, an excess or shortage occurs in the traveling distance due to the deviation of an initial value. The stacker crane 3 is not located in the article transfer horizontal position PH1. When the storing transfer control is carried out, a shift is made from the proper article transfer position relative to the article storage unit 4. In this case also, the article Q will not be transferred to the proper position in the direction of width of the article storage unit 4.

With the article transport apparatus according to this invention, a position of the palette P in which the middle position along the traveling path of the palette P placed on the article transfer device 11 coincides with the middle position along the traveling path of the fork 23 of the article transfer device 11 is set as the proper transfer position in the traveling direction relative to the stacker crane 3. A position of the stacker crane 3 in which the middle position along the traveling path of the article storage unit 4 coincides with the middle position along the traveling path of the fork 23 of the article transfer device 11 is set as the proper article transfer position relative to the article storage unit 4.

Figure 5:
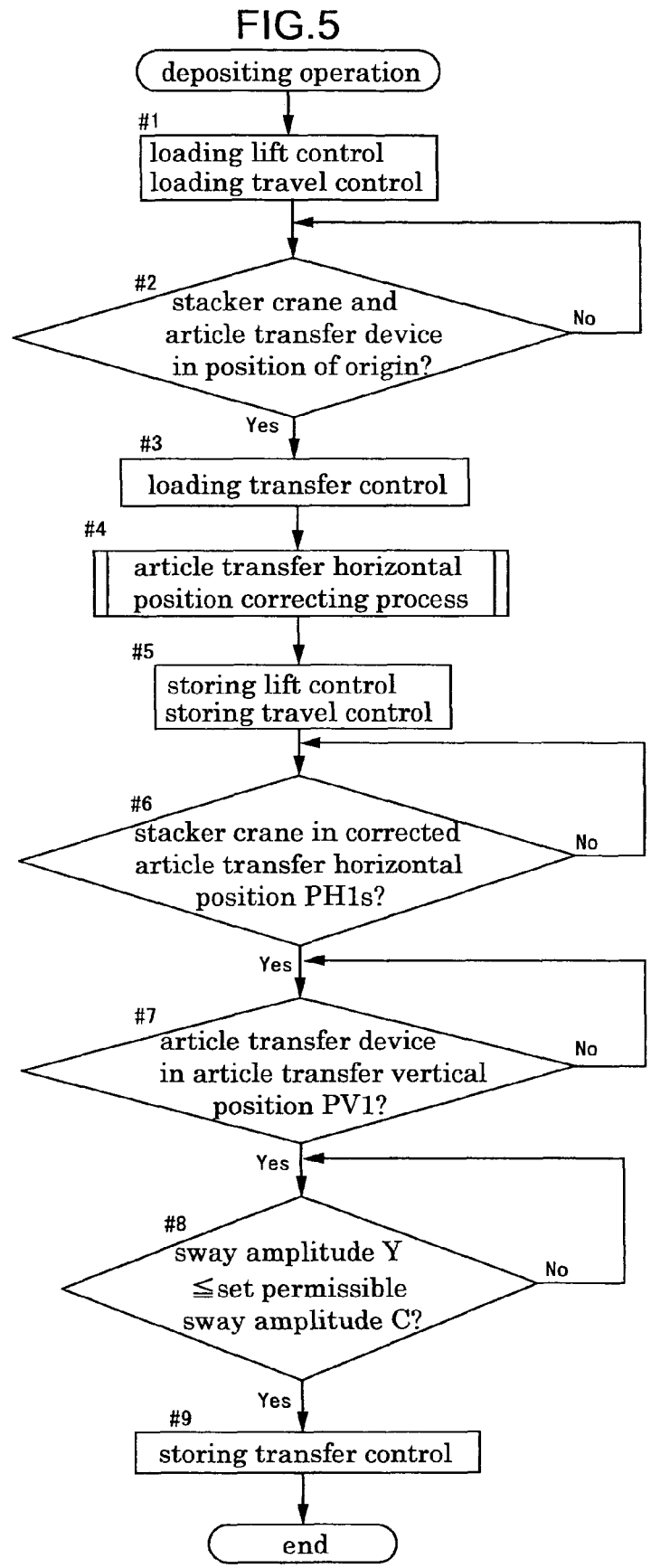
FIG. 5 is a flow chart of a storing operation.

The ground controller 7 of this article transport apparatus performs the loading transfer control in step #3 of the storing operation shown in FIG. 5, i.e. transfers the article Q to the stacker crane 3 located in the position of origin P0, and thereafter performs the article transfer horizontal position correcting process in step #4. Thus, even when the article Q is not transferred to the predetermined proper transfer position on the stacker crane 3, or when the article Q is transferred to the predetermined proper transfer position on the stacker crane 3 but the position of the stacker crane 3 deviates from the position of origin P0, the article Q will be transferred to the proper position in the article storage unit 4 by the storing travel control and storing transfer control.

Figure 6:
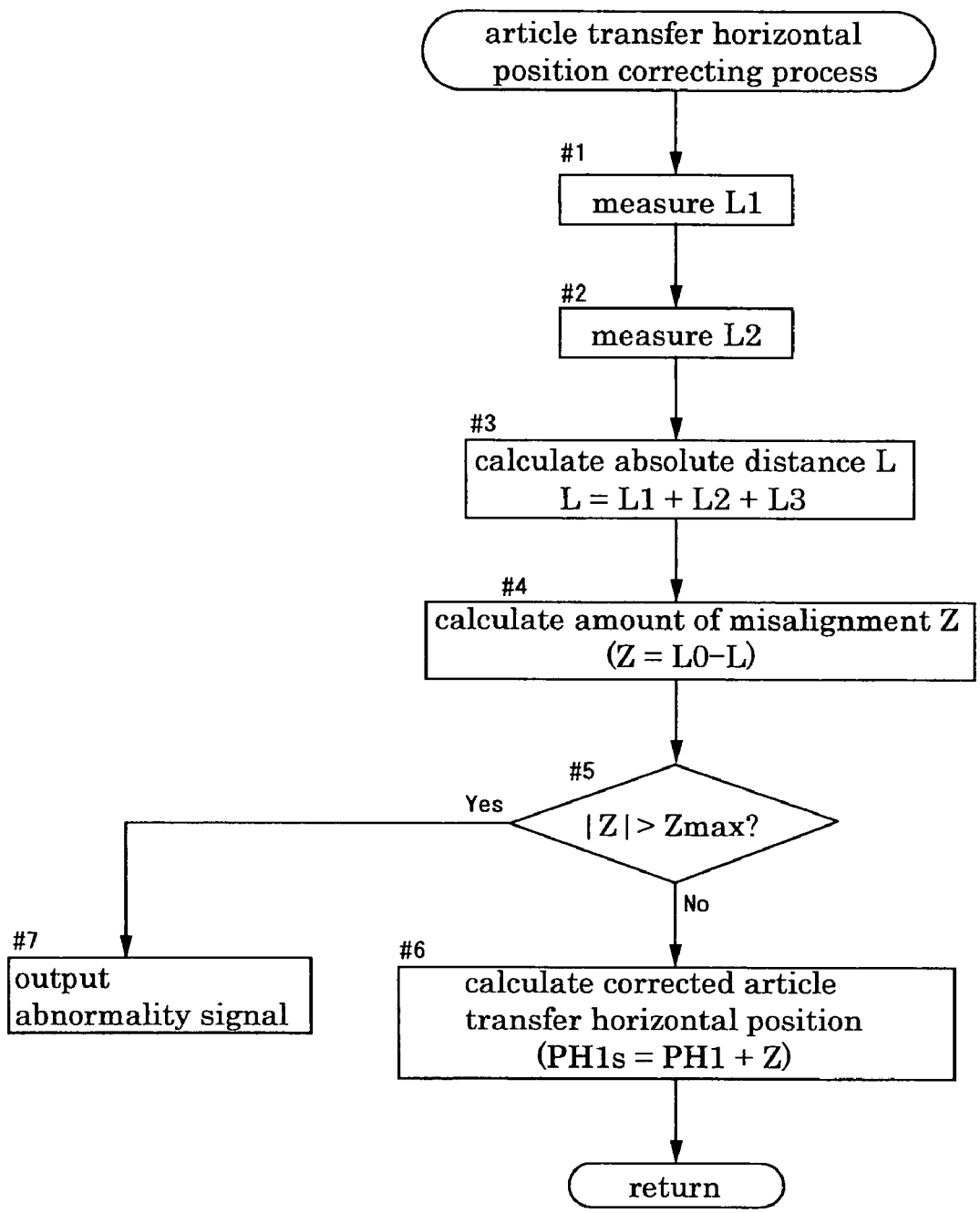
FIG. 6 is a flow chart of an article transfer horizontal position correcting process.

The article transfer horizontal position correcting process will be described hereinafter with reference to the flow chart shown in FIG. 6. In step #1, the distance L1 (FIG. 7) from the mounting position of the distance sensor 31 (hereinafter called the crane side reference position a1) to the side surface of the palette P is measured based on the output of the distance sensor 31. In step #2, the distance L2 (FIG. 7) from the position of the horizontal laser range finder 29 (hereinafter called the ground side reference position a2) to the reflector plate 30 mounted on the stacker crane 3 is measured based on the output of the horizontal laser range finder 29.

The distance L1 and distance L2 measured in step #1 and step #2 are added to a distance L3 between the reflector plate 30 and distance sensor 31 which is determined by design, thereby obtaining a distance L from the ground side reference position a2 to the side surface of the palette P (step #3). As seen from FIG. 7 also, the distance L calculated in step #3 indicates a distance of the article Q from the ground side reference position a2 in the storing process (hereinafter called absolute distance L of the article Q).

In step #4, a difference between the absolute distance L of the article Q and absolute distance L0 of the article Q located in the predetermined proper position (hereinafter called proper absolute distance L0) as amount of misalignment Z from the predetermined proper position of the article Q. The predetermined proper position is an originally intended proper position of the article Q relative to the ground side reference position a2. Specifically, it is a position relative to the ground side reference position a2 of the article Q located in the predetermined proper transfer position on the stacker crane 3 when the latter is properly located in the position of origin P0.

Thus, the absolute distance L0 of the article Q is given when the stacker crane 3 is properly located in the position of origin P0 by the loading travel control, and the article Q is located in the predetermined proper transfer position in the traveling direction relative to the stacker crane 3 by the loading transfer control. The amount of misalignment Z is derived from a difference between the above absolute distance L0 and the absolute distance L of the article Q calculated in step #3, i.e. from L0−L.

In step #5, the ground controller 7 verifies the value of amount of misalignment Z calculated in step #4. When the magnitude (i.e. absolute value) |Z| of the amount of misalignment Z, that is the misalignment range, exceeds a predetermined permissible amount of misalignment Zmax, the ground controller 7 determines the situation to be abnormal and outputs an abnormality signal in step #7. In this way, the ground controller 7 can perform a self-checking of stopping accuracy of the stacker crane 3 and loading and unloading conveyers 8. When a misalignment range exceeds a predetermined permissible amount of misalignment Zmax due to an abnormality in the operation of the loading and unloading conveyers 8 or the operation of the stacker crane 3 under the loading travel control, the ground controller 7 can output a signal indicating the abnormality to notify the abnormality to the superintendent of the apparatus.

When the magnitude |Z| of the amount of misalignment Z is found in step #5 not to exceed the predetermined permissible amount of misalignment Zmax, the article transfer horizontal position PH1 is corrected according to the amount of misalignment Z. Specifically, the amount of misalignment Z is added to the article transfer horizontal position PH1 set for the article storage unit 4 which is the destination of the article Q, to determine the corrected article transfer horizontal position PH1s (step #6).

When, for example, the absolute distance L of the article Q is shorter than the proper absolute distance L0 (Z>0 in this case), the article Q transferred from the loading and unloading conveyer 8 to the stacker crane 3 under the loading transfer control is located in a position remote by the magnitude |Z| of the amount of misalignment Z from the proper transfer position relative to the intended article storage unit 4. Therefore, a position remote by the magnitude |Z| of the amount of misalignment Z is set as the corrected article transfer horizontal position PH1s in order to move the stacker crane 3 under the storing travel control a distance longer by the magnitude |Z| of the amount of misalignment Z than when no misalignment takes place.

Conversely, when the absolute distance L of the article Q is longer than the proper absolute distance L0 (Z<0 in this case), the article Q transferred from the loading and unloading conveyer 8 to the stacker crane 3 under the loading transfer control is located in a position closer by the magnitude |Z| of the amount of misalignment Z than the proper transfer position relative to the intended article storage unit 4. Therefore, a position closer by the magnitude |Z| of the amount of misalignment Z is set as the corrected article transfer horizontal position PH1s in order to move the stacker crane 3 under the storing travel control a distance shorter by the magnitude |Z| of the amount of misalignment Z than when no misalignment takes place.

Figure 8:
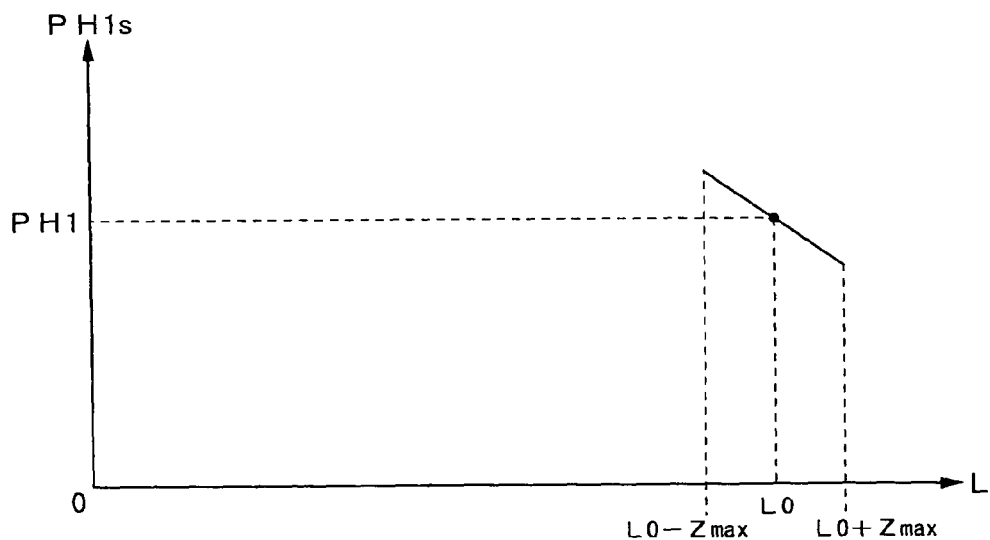
FIG. 8 is a graph showing a relationship between an absolute distance and a corrected article transfer horizontal position.

As shown in FIG. 8, the relationship between absolute distance L and corrected transfer horizontal position PH1s, in graphic representation, describes straight lines. As seen from FIG. 8, when the absolute distance L is the proper absolute distance L0, the amount of correction is "0" and the corrected article transfer horizontal position PH1s coincides with the article transfer horizontal position PH1 before correction. The shorter the absolute distance L is than the proper absolute distance L0, the article transfer run position PH1 becomes the corrected article transfer horizontal position PH1s which is the farther away from the position of origin P0. The longer the absolute distance L is than the proper absolute distance L0, the article transfer run position PH1 becomes the corrected article transfer horizontal position PH1s which is the nearer to the position of origin P0.

By setting the corrected article transfer horizontal position PH1s in this way, the article Q may be stored reliably in the article storage unit 4 of the storage rack 1 despite any variations in the position in the traveling direction of the stacker crane 3 in the travel control occurring upon completion of the loading travel control, and any variations in the transfer position in the traveling direction of the article Q relative to the stacker crane 3. The reduced length of the storage racks 1 in the traveling direction of the stacker crane 3 results in a reduction in the manufacturing cost of the storage racks 1, a reduction in the installation space of the article storage system SU and reduced traveling distances of the stacker crane 3. It is thus possible to realize improved transporting efficiency and lowering of running cost.

OTHER EMBODIMENTS

Other embodiment will be set out below.

(1) In the above embodiment, the ground controller 7 refers to the predetermined permissible sway amplitude C having a fixed value. Alternatively, the ground controller 7 may be constructed to set a different value to the permissible sway amplitude C according to a height of article transfer vertical position PV1 relative to an article storage unit 4 serving as a destination. A large value may be set to the permissible sway amplitude C when, for example, the storing process is carried out for transfer to an article storage unit 4 in a low position. Conversely, a small value may be set to the permissible sway amplitude C when the storing process is carried out for transfer to an article storage unit 4 in a high position. With this construction, an article Q can be transferred to an article storage unit 4 in a low position when a sway of the lift mast 13 at the height of the article storage unit 4 is at an amplitude for enabling the transfer. It is thus possible to avoid an inconvenience that the transfer operation is not started until a sway at the upper end dampens although the sway of lift mast 13 at the height of the article storage unit 4 has already become an amplitude for enabling the transfer.

(2) In the above embodiment, the article transfer horizontal position PH1 relative to the article storage unit 4 serving as the destination is corrected based on the position of the article Q relative to the stacker crane 3 and the position of the stacker crane 3 relative to the loading and unloading conveyer 8. Alternatively, the article transfer horizontal position PH1 relative to the article storage unit 4 serving as the destination may be corrected based on the position of the article Q relative to the stacker crane 3, i.e. based on distance L1. The article transfer horizontal position PH1 relative to the article storage unit 4 serving as the destination may be corrected based on the position of the stacker crane 3 relative to the loading and unloading conveyer 8, i.e. based on distance L2.

(3) In the above embodiment, each storage rack 1 has article storage units 4 arranged vertically and horizontally. This construction is not limitative, but the article storage units 4 may be arranged only in the horizontal direction.

(4) The lift deck 12 may be constructed vertically movable by a lift motor and a gear, driven by the lift motor, arranged on the lift deck 12, and gear teeth attached to a lift mast 13 and meshed with the gear. In this case, a rotation sensor that detects rotation of the lift motor or gear may be used as vertical position detecting means. This vertical position detecting means has a reference position that may be set as desired.

(5) At least part of the plurality of functions of operation control means noted hereinbefore may be performed by a controller provided on the mobile body (mobile body side controller). In this case, the operation control means comprises the ground controller and mobile body side controller.

(6) It is possible to define the misalignment amount as the difference between the position of the article and the proper transfer position with respect to the mobile body based only on the detected information by the loading position detection means. It is also possible to define the misalignment amount as the difference between the mobile body and a predetermined proper position with respect to any standard position on the ground.

What is claimed is:

1. An article transport apparatus comprising:
    an article transporting mobile body movable along a predetermined path extending along a storage rack having a plurality of article storage units;
    a loading unit disposed along and fixed with respect to said predetermined path for supporting an article to be stored;
    an article transfer device disposed on said mobile body for transferring the article;
    operation control means for controlling traveling operation of said mobile body and transfer operation of said article transfer device; and
    article position detection means for detecting a position, in a first direction along a traveling direction of said mobile body, of the article transferred from said loading unit to said mobile body;
    wherein said operation control means obtains a misalignment amount with respect to a predetermined proper position, in said first direction, of the article transferred from said loading unit to said mobile body, based on detected information from said article position detection means, and corrects a horizontal component of an article transfer position for an article storage unit to which the article is to be transferred, based on the misalignment amount, and
    wherein said article position detection means includes loading position detection means disposed on said mobile body for detecting a position, in said first direction, of the article transferred to said mobile body relative to said mobile body; and said operation control means determines, as said misalignment amount, a misalignment amount of the article transferred to said mobile body with respect to a predetermined proper transfer position in said first direction relative to said mobile body based on the detected information from said article position detection means.

2. An article transport apparatus as defined in claim 1, further comprising mobile body position detection means for detecting a position on said predetermined path of said mobile body;
    wherein said operation control means performs a loading travel control for running said mobile body to an article transfer position for said loading unit based on detected information from said mobile body position detection means, a storing travel control for running said mobile body to the article transfer position corresponding the article storage unit which is the destination of the article, among said plurality of article storage units, based on the detected information from said mobile body position detection means, a loading transfer control for operating said article transfer device to transfer the article from said loading unit to said mobile body when said mobile body is located in the article transfer position for said loading unit, and a storing transfer control for operating said article transfer device to transfer the article from said mobile body to said article storage unit when said mobile body is located in the article transfer position for the article storage unit which is the destination of the article.

3. An article transport apparatus as defined in claim 1, wherein:
    said article position detection means includes mobile body position detection means for detecting a position of said mobile body on said predetermined path, and
    the operation control means determines, as said misalignment amount, a misalignment amount of the mobile body with respect to an article transfer position for the loading unit based on detected information from the mobile body position detection means.

4. An article transport apparatus as defined in claim 1, wherein said article position detection means includes mobile body position detection means for detecting a position of said mobile body on said predetermined path, and loading position detection means disposed on said mobile body for detecting a position, in said first direction, of the article transferred to said mobile body relative to said mobile body;
    said operation control means is adapted to receive output from said loading position detection means and output from said mobile body position detection means, and to determine a misalignment amount of the article transferred to said mobile body from a predetermined proper transfer position in said first direction based on the detected information from said loading position detection means and said mobile body position detection means.

5. An article transport apparatus as defined in claim 1, wherein said operation control means is adapted to determine that an abnormality has occurred and to output a signal indicating the abnormality when said misalignment amount determined based on the detected information from said article position detection means exceeds a predetermined permissible range.

6. An article transport apparatus as defined in claim 2, wherein:
    said storage rack has said article storage units arranged in vertical columns and horizontal rows;
    said article transfer device is vertically movable along a lift post erected on said mobile body; and
    said operation control means is adapted to move said article transfer device vertically to an article transfer position for the article storage unit which is the destination of the article, among said plurality of article storage units, based on detected information from vertical position detection means for detecting a vertical position of said article transfer device.

7. An article transport apparatus as defined in claim 2, further comprising sway detection means for detecting a sway amplitude of said lift posts,
    wherein said operation control means is adapted to perform said storing transfer control when the sway amplitude of said lift posts is determined to be within a predetermined permissible sway amplitude based on detected information from said sway detection means.

8. A method of operating an article transport apparatus, said article transport apparatus having an article transporting mobile body movable along a predetermined path extending along a storage rack having a plurality of article storage units, a loading unit disposed adjacent and fixed with respect to said predetermined path for supporting an article to be stored, an article transfer device disposed on said mobile body for transferring the article, operation control means for controlling traveling operation of said mobile body and transfer operation of said article transfer device, and article position detection means for detecting a position, in a first direction along a traveling direction of said mobile body, of the article transferred from said loading unit to said mobile body, said method comprising the steps of:

- obtaining a misalignment amount with respect to a predetermined proper position, in said first direction, of the article transferred from said loading unit to said mobile body, based on detected information from said article position detection means;
- correcting a horizontal component of an article transfer position for an article storage unit to which the article is to be transferred, based on the misalignment amount and
- determining, as said misalignment amount, a misalignment amount of the article transferred to said mobile body with respect to a predetermined proper transfer position in said first direction relative to said mobile body based on the detected information from said article position detection means,
- wherein said article position detection means includes loading position detection means disposed on said mobile body for detecting a position, in said first direction, of the article transferred to said mobile body relative to said mobile body.

9. A method as defined in claim 8, wherein said article transport apparatus has mobile body position detection means for detecting a position of said mobile body on said predetermined path, said method further comprising the steps of:

- causing said mobile body to run to an article transfer position for said loading unit based on detected information from said mobile body position detection means;
- operating said article transfer device to transfer the article from said loading unit to said mobile body when said mobile body is located in the article transfer position for said loading unit;
- causing said mobile body to run to the article transfer position for the article storage unit which is the destination of the article, among said plurality of article storage units, based on the detected information from said mobile body position detection means; and
- causing said operation control means to perform a storing transfer control for operating said article transfer device to transfer the article from said mobile body to said article storage unit when said mobile body is located in a location corresponding to the article transfer position for the article storage unit which is the destination of the article.

10. A method as defined in claim 8, wherein said step of obtaining a misalignment amount includes the step of:

- determining a misalignment amount of the article transferred to said mobile body from a predetermined proper transfer position in said first direction based on the detected information from said article position detection means and said mobile body position detection means.

11. A method as defined in claim 8, wherein said article position detection means includes mobile body position detection means for detecting a position of said mobile body on said predetermined path, and loading position detection means disposed on said mobile body for detecting a position, in said first direction, of the article transferred to said mobile body relative to said mobile body, and the step of obtaining a misalignment amount includes a step of:

- obtaining a misalignment amount of the article transferred to said mobile body from a predetermined proper transfer position in said first direction based on the detected information from said loading position detection means and said mobile body position detection means.

12. A method as defined in claim 8, wherein an abnormality is determined to have occurred and a signal indicating the abnormality is outputted when said misalignment amount exceeds a predetermined permissible range.

13. A method as defined in claim 8, wherein said storage rack has said article storage units arranged in vertical columns and horizontal rows, said article transfer device is vertically movable along lift posts erected on said mobile body, and vertical position detection means is provided for detecting a vertical position of said article transfer device, said method further comprising the step of:

- moving said article transfer device vertically to an article transfer position for the article storage unit which is the destination of the article, among said plurality of article storage units, based on detected information from said vertical position detection means.

14. A method as defined in claim 9, wherein said article transport apparatus has sway detection means for detecting a sway amplitude of said lift posts, and

- said storing transfer control step is executed when the sway amplitude of said lift posts is determined to be within a predetermined permissible sway amplitude based on detected information from said sway detection means.

15. An article transport apparatus as defined in claim 1, wherein the predetermined path is defined by a rail, and the mobile body has a plurality of wheels positioned on the rail.

16. An article transport apparatus as defined in claim 1, wherein

- said loading position detection means:
  a) includes a sensor that outputs one of light and sound, and that receives the one of light and sound reflected by one of a side wall of the article and a reflecting member; and
  b) detects a distance by measuring a time elapsed between the output and reception.

17. A method as defined in claim 8, wherein the predetermined path is defined by a rail, and the mobile body has a plurality of wheels positioned on the rail.

18. A method as defined in claim 8, wherein

- said loading position detection means:
  a) includes a sensor that outputs one of light and sound, and that receives the one of light and sound reflected by one of a side wall of the article and a reflecting member; and
  b) detects a distance by measuring a time elapsed between the output and reception.

* * * * *